(12) United States Patent
Onodera

(10) Patent No.: US 6,886,159 B2
(45) Date of Patent: Apr. 26, 2005

(54) COMPUTER SYSTEM, VIRTUAL MACHINE, RUNTIME REPRESENTATION OF OBJECT, STORAGE MEDIA AND PROGRAM TRANSMISSION APPARATUS

(75) Inventor: Tamiya Onodera, Ageo (JP)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 09/809,911

(22) Filed: Mar. 16, 2001

(65) Prior Publication Data

US 2004/0205701 A1 Oct. 14, 2004

(30) Foreign Application Priority Data

Mar. 16, 2000 (JP) ........................................ 2000-074223

(51) Int. Cl.[7] ............................................... G06F 9/44
(52) U.S. Cl. ......................................................... 717/165
(58) Field of Search ................................. 717/140–166; 719/315–332; 710/5; 709/331–332

(56) References Cited

U.S. PATENT DOCUMENTS

| | | | | |
|---|---|---|---|---|
| 4,972,365 A | * | 11/1990 | Dodds et al. ................... | 710/5 |
| 5,632,034 A | * | 5/1997 | O'Farrell ...................... | 717/140 |
| 6,317,872 B1 | * | 11/2001 | Gee et al. ..................... | 717/152 |

* cited by examiner

Primary Examiner—Kakali Chaki
Assistant Examiner—Tuan A Vu
(74) Attorney, Agent, or Firm—Scully, Scott, Murphy & Presser; Douglas W. Cameron, Esq.

(57) ABSTRACT

The invention provides a representation method for an object that is fast and has an extremely little effect on the execution efficiency of a processing system. A computer system that implements an object-oriented programming language according to the invention as runtime representation for an object in programming language that is implemented, comprises an object, a type information block, and a class structure, wherein the object has a header including a pointer to the type information block, wherein the type information block has a class pointer pointing to the class structure, wherein a plurality of class pointers are provided depending on the number of states of the object and individual class pointers are associated with individual states of the object, and wherein the pointer included in the header of the object uses lower bits to point to the class pointers individually in order to represent the states of the object.

14 Claims, 6 Drawing Sheets

| Operation 1 | load r12, [r3]<br>load r12, [r12]<br>load r12, [r12+o] |
|---|---|
| Operation 2 | load r12, [r3]<br>or r12, $(2^m-1)-(2^n-1)$<br>load r12, [r12+4+4*i]<br>call [r12] |

Fig. 3

When not using lopsided branch characteristics

```
lwz r0, 0 (r3)
ori r12, r0, (2^m -1)-(2^n -1)
lwz r0, 4+4*i (r0)
mtctr r0
```

When using lopsided branch characteristics

```
lwz r0, 0 (r3)
ori r12, r0, (2^m -1)-(2^n -1)    /* Parallel execution with next lwz */
retry:
cmp cr0, r12, r0                   /* Parallel execution with next lwz */
lwz r0, 4+4*i (r0)
be+ docall                         /* Taken in most cases       */
mr r0, r12                         /* Not executed in most cases */
b retry                            /* Not executed in most cases */
docall:
mtctr r0
```

| Operation 1 | load r12, [r3]<br>load r12, [r12]<br>load r12, [r12+o] |
|---|---|
| Operation 2 | load r12, [r3]<br>load r12, [r12+4+4*i]<br>call [r12] |

Fig. 6

| Operation 1 | load r12, [r3]<br>and r12, ~($2^n-1$)<br>load r12, [r12]<br>load r12, [r12+o] |
|---|---|
| Operation 2 | load r12, [r3]<br>and r12, ~($2^n-1$)<br>load r12, [r12+4+4*i]<br>call [r12] |

COMPUTER SYSTEM, VIRTUAL MACHINE, RUNTIME REPRESENTATION OF OBJECT, STORAGE MEDIA AND PROGRAM TRANSMISSION APPARATUS

FIELD OF THE INVENTION

The present invention relates to a method for runtime representation for an object to execute a program in a computer system that implements an object-oriented programming language.

In a computer system where an object-oriented programming language such as Java, Smalltalk, C++ is implemented, it is essential to provide runtime representation of a state of the object in order to execute a program described in such a programming language. How to provide this runtime representation of the state of the object has a crucial effect on the execution efficiency of a processing system.

Figure 5:
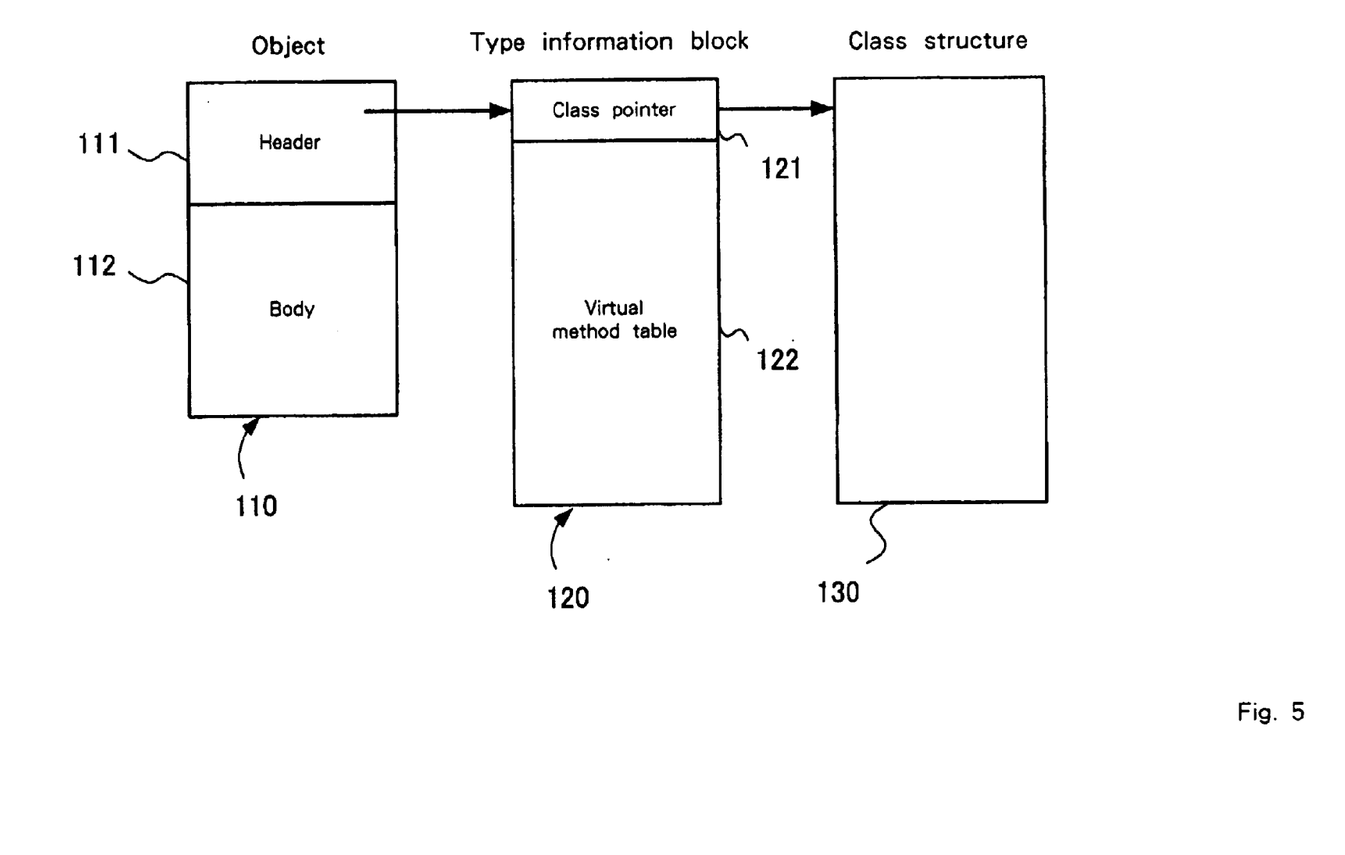
FIG. 5 depicts the arrangement of an object that is typically used in conventional implementation of an object-oriented programming language.

FIG. 5 depicts the arrangement of an object that is typically used in implementation of an object-oriented programming language. Referring to FIG. 5, typically an object 110 has a header 111 and a body of instance variables 112, and uses one word in the header 111 to store a pointer to a type information block 120.

A type information block 120 is composed of a class pointer 121 and a virtual method table 122. The class pointer 121 points to a class structure 130 that aggregates information on the class of the object 110. The class structure 130 includes a large amount of information of the highest importance in the runtime system. When a pointer to the object 110 is given in the object configuration like this, either the reference of a member of the class structure 130 or the reference of a virtual method table 122 is performed. The reference of a member of the class structure 130 is performed in many cases such as upon casting, replication, class loading, compiling, etc., while the reference of a virtual method table 122 is performed upon the calling of a virtual function.

As runtime representation of a state of the object, making use of bits in the above mentioned header 111 of the object 110 is a simple and fastest method. In this case, the number of state representations that can be represented depends on the number of available bits in the header 111 of the object 110.

There is also another method where the type information block 120 is located at an appropriate boundary(e.g. 32 byte boundary) and the lower bits(e.g. five bits) of the pointer to the type information block 120 are used for representing the state of the object 110. This method needs logical operations to take out a pointer to the type information block 120.

Figure 6:
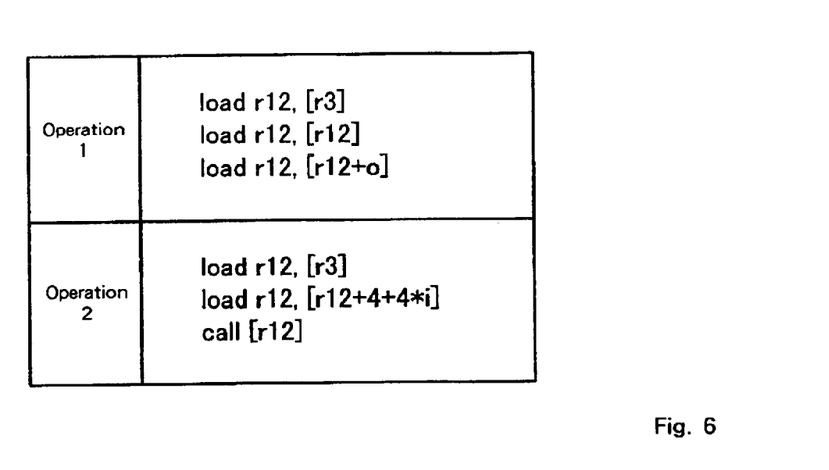
FIG. 6 shows an example of operation codes when executing an operation to refer to a member located in offset "o" in the class structure(operation 1) and an operation to call a method that corresponds to an index "i" in the virtual method table (operation 2).

FIG. 6 shows, in the object configuration shown in FIG. 5, an example of operation codes when executing an operation to refer to a member located in offset "o" in the class structure 130(operation 1) and an operation to call a method that corresponds to an index "i" in the virtual method table 122(operation 2).

Figure 7:
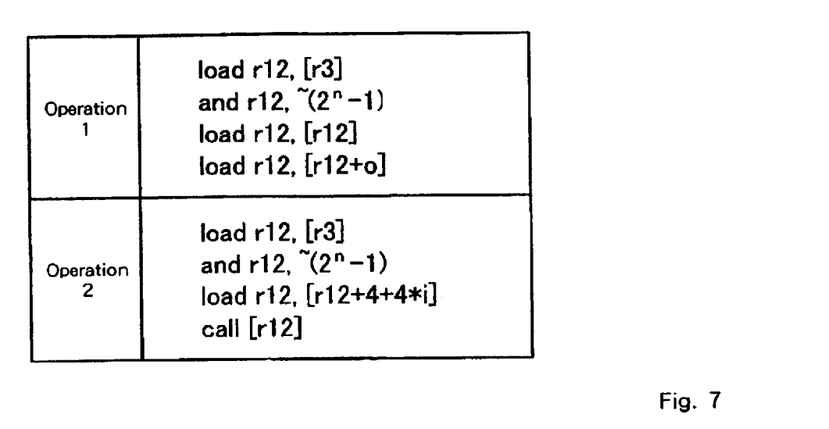
FIG. 7 shows a modification of operation codes shown in FIG. 6 where the state of the object is represented using lower bits of the pointer to the type information block.

In each code shown in FIG. 6, "load" reads a value into a register(e.g. "load r12, [r3]" loads into r12 the contents of the memory location whose address is given by the contents of r3), and "call" calls a function call with a register. FIG. 7 shows a modification of operation codes shown in FIG. 6 where the state of the object 110 is represented using lower bits of the pointer to the type information block 120 for an object 110.

Comparing FIG. 6 and FIG. 7, in either case of operation 1 and operation 2, a code that executes a logical operation "and r12, ~($2^n$−1)" is added after "load r12, [r3]" in the first line.

As mentioned above, in a computer system that implements an object-oriented programming language, how to provide runtime representation of the state of the object has a great effect on the execution efficiency of a processing system. Therefor, it is highly desired to provide runtime representation of the state of the object to be fast and reduce an effect on the execution efficiency of a processing system.

However, a fast representation method using bits of the object header has not been practical because only a few bits are available.

A representation method using lower bits of a pointer to point to a type information block has a problem where an access to information in the type information block gets slower on the whole because logical operations are needed to take out a pointer to the type information block.

Therefor, it is an object of the present invention to provide a representation method for the state of the object that is fast and has an extremely little effect on the execution efficiency of a processing system.

SUMMARY OF THE INVENTION

Accordingly, the present invention provides a computer system that implements an object-oriented programming language, comprises an object, a type information block, and a class structure as runtime representation for an object in the object-oriented programming language, wherein the object has a header including a pointer to the type information block and data itself, wherein the type information block has a class pointer pointing to the class structure and a virtual method table, wherein a plurality of class pointers are provided depending on the number of states of the object to be represented and individual class pointers are associated with individual states of the object, wherein the pointer included in the header of the object uses lower bits of the pointer to point to the class pointers individually in order to represent the states of the object.

The class pointers of the type information block are provided in multilevel. According to this configuration, the number of bits of the pointer included in the header of the object required to represent the states of the object is favorably restrained.

The pointer included in the header of the object uses m middle bits to point to $2^m$ class pointers in order to represent $2^m$ states of the object. According to this configuration, the state of the object can be favorably determined by easy bit test.

Further, the number of class pointers is $2^m$ and the size of the class pointers is $2^n$ bytes, The type information block is allocated such that (m+n) lower bits of the pointer included in the header of the object be $(2^{(m+n)}-1)-(2^n-1)$ when the pointer points to the class pointer at the highest address in the typo information block. $2^m$ class pointers may then be allocated in multilevel toward a lower address from the class pointer pointed by the pointer.

According to this configuration, this pointer slides the multileveled class pointers in the type information block by changing values of m bits ranging from (m+n)-th bit to (n+1)-th bit of the pointer in the object, thereby enabling efficient representation of the states of the object.

In another aspect of the invention, a virtual machine that executes a program described in an object-oriented programming language on a computer system, comprises an object, a type information block, and a class structure as runtime representation for an object in the object-oriented programming language, wherein the object has a header including a pointer to the type information block and data itself, wherein the type information block has a class pointer pointing to the class structure and a virtual method table, wherein a plurality of class pointers are provided depending on the number of states of the object to be represented and individual class pointers are associated with individual states of the object, wherein the pointer included in the header of the object uses lower bits of the pointer to point to the class pointers individually in order to represent the states of the object.

The class pointers of the type information block in the virtual machine are provided in multilevel. According to this configuration, the number of bits of the pointer included in the header of the object required to represent the states of the object is favorably restrained.

In a further aspect of the invention, a method for runtime representation of an object described in an object-oriented programming language when executing the object on a computer system that implements the object-oriented programming language, comprises an object, a type information block having a plurality of class pointers corresponding to the states of the object, and a class structure pointed by the class pointers; wherein the number of class pointers is $2^m$ and the size of the class pointers is $2^n$ bytes. The type information block is allocated such that (m+n) lower bits of a pointer included in a header of the object be $(2^{(m+n)}-1)-(2^n-1)$ when the pointer points to the class pointer at the highest address in the type information block. $2^m$ class pointers may then be allocated in multilevel toward a lower address from the class pointer pointed by the pointer, thereby a value of the pointer pointing to the type information block is set to a value pointing to the class pointer associated with the current state of the object. Initial values of (m+n) lower bits of the pointer included in the header of the object to point to the type information block are set where high order m digits are 1s and low order digits are 0s, wherein the values of (m+n) lower bits of the pointer are changed depending on the change of state of the object in order to point to the class pointer corresponding to that state.

According to this configuration, clearing a bit represents the change of state of the object and the state is identified by a simple bit test. A value to be changed to actually specify the state corresponds to high order m digits in lower (m+n) bits of this pointer.

In a further aspect of the invention, storage media for storing a program that is readable by input means of a computer, comprises a software product implementing a processing system for an object-oriented programming language, wherein an object, a type information block, and a class structure are provided as runtime representation of the object in the object-oriented programming language that is implemented in the computer, wherein the object has a header including a pointer to the type information block and data itself, wherein the type information block has class pointers pointing to the class structure and a virtual method table, wherein the class pointers are provided in multilevel depending on the number of states of the object to be represented and individual class pointers are associated with individual states of the object, wherein the pointer included in the header of the object uses lower bits of the pointer to point to the class pointers individually in order to represent the states of the object.

According to this configuration, in all computer systems where this software product has been installed, state representation of an object is favorably performed using multileveled class pointers in the type information block.

In this software product, the pointer included in the header of the object uses m middle bits to point to $2^m$ class pointers in order to represent $2^m$ states of the object.

Further, in this software product, the number of class pointers is $2^m$ and the size of the class pointers is $2^n$ bytes. The type information block is allocated such that (m+n) lower bits of the pointer included in the header of the object be $(2^{(m+n)}-1)-(2^n-1)$ when the pointer points to the class pointer at the highest address in the type information block. $2^m$ class pointers may then be allocated in multilevel toward a lower address from the class pointer pointed by the pointer.

In a further aspect of the invention, a program transmission apparatus, comprising: storage means for storing a software product implementing a processing system for an object-oriented programming language, wherein an object, a type information block, and a class structure are provided as runtime representation of the object in the object-oriented programming language that is implemented in the computer, the object having a header including a pointer to the type information block and data itself, the type information block having class pointers pointing to the class structure and a virtual method table, the class pointers of the type information block are provided in multilevel depending on the number of states of the object to be represented and individual class pointers are associated with individual states of the object, wherein the pointer included in the header of the object uses lower bits of the pointer to point to the class pointers individually in order to represent the states of the object; and a transmission means for reading a program from the storage means and transmitting the program.

According to this configuration, in all computer systems that download and execute this software product, state representation of an object is favorably performed using multileveled class pointers in the type information block.

In this software product, the pointer included in the header of the object uses m middle bits to point to $2^m$ class pointers in order to represent $2^m$ states of the object.

Further, in this software product, the number of class pointers is $2^m$ and the size of the class pointers is $2^n$ bytes. The type information block is allocated such that (m+n) lower bits of the pointer included in the header of the object be $(2^{(m+n)}-1)-(2^n-1)$ when the pointer points to the class pointer at the highest address in the type information blocks, $2^m$ class pointers may then be allocated in multilevel toward a lower address from the class pointer pointed by the pointer.

DESCRIPTION OF THE SYMBOLS

10: Object
11: Header
12: Body
20: Type information block
21: Class pointer section
21a, 21b, 21c, 21d: Class pointer
22: Virtual method table
30: Class structure

DETAILED DESCRIPTION

Figure 1:
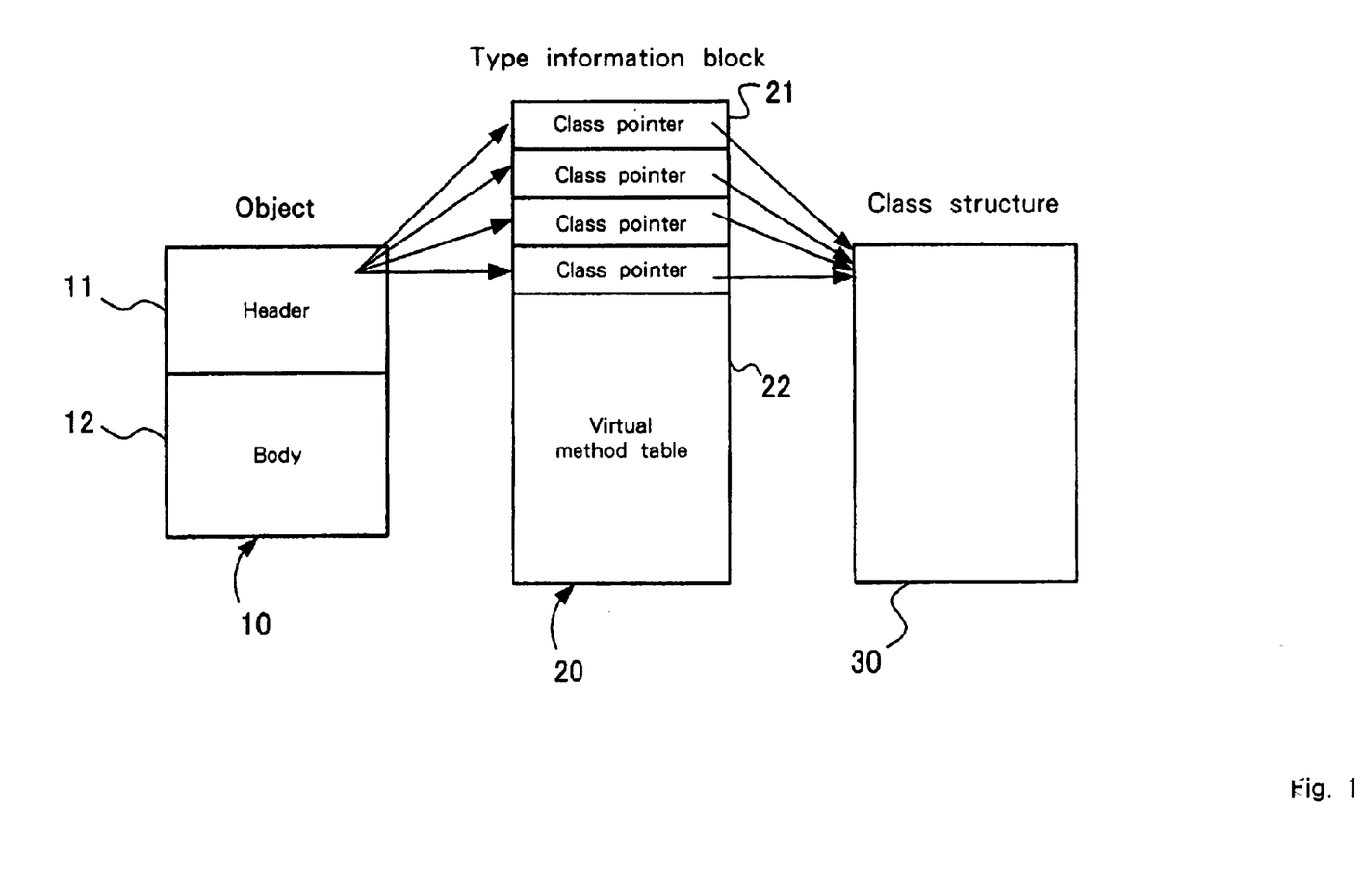
FIG. 1 depicts the arrangement of an object that is used in a computer system that implements an object-oriented programming language in an embodiment of the present invention.
Figure 8:
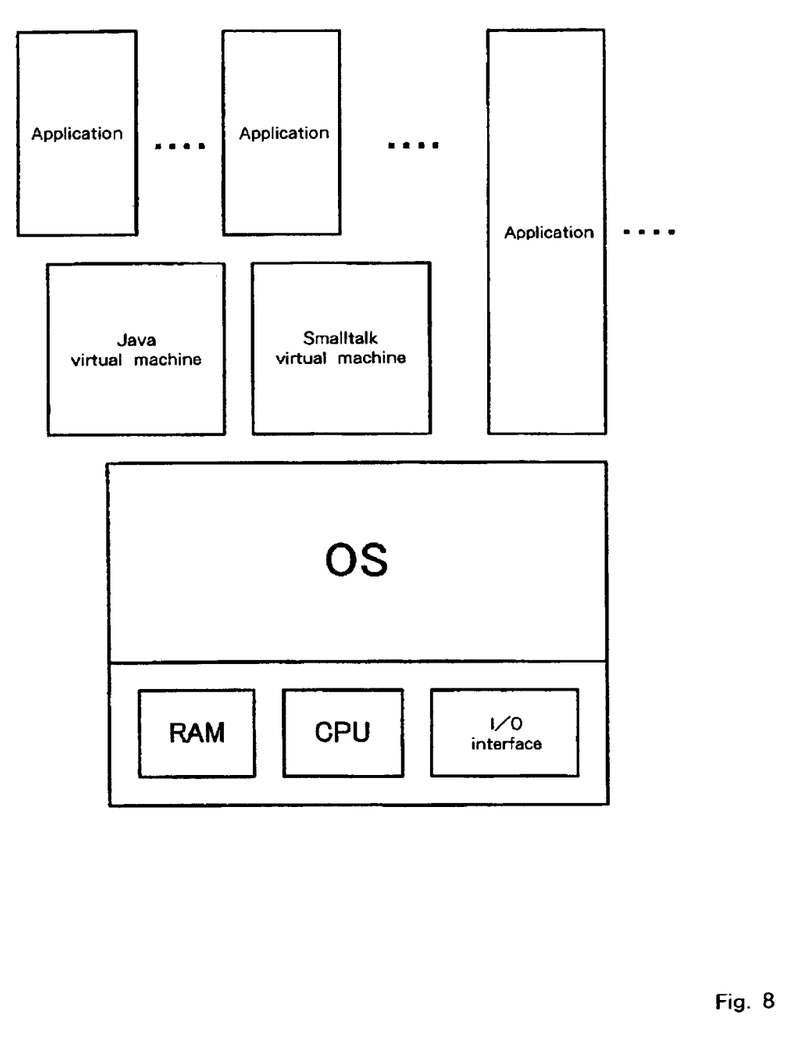
FIG. 8 depicts a computer system where an object-oriented programming language is implemented by mounting a virtual machine.

Hereinafter, the present invention will be described in detail referring to the accompanying drawings. FIG. 1 depicts the arrangement of an object that is used in a computer system that implements an object-oriented programming language in an embodiment of the present invention. As is shown in FIG. 8, the implementation of an object-oriented programming language is achieved by mounting a virtual machine or a processing system of the programming language that is provided by a compiler, etc. (in the shown drawing, virtual machines of Java and Smalltalk) on a computer system.

In FIG. 1, a symbol 10 indicates an object, a symbol 20 indicates a type information block, and a symbol 30 indicates a class structure.

The object 10 is composed of a header 11 and a body of program modules 12, and the header 11 stores a pointer(that is called "T pointer" hereinafter) to the type information block 20.

Figure 2:
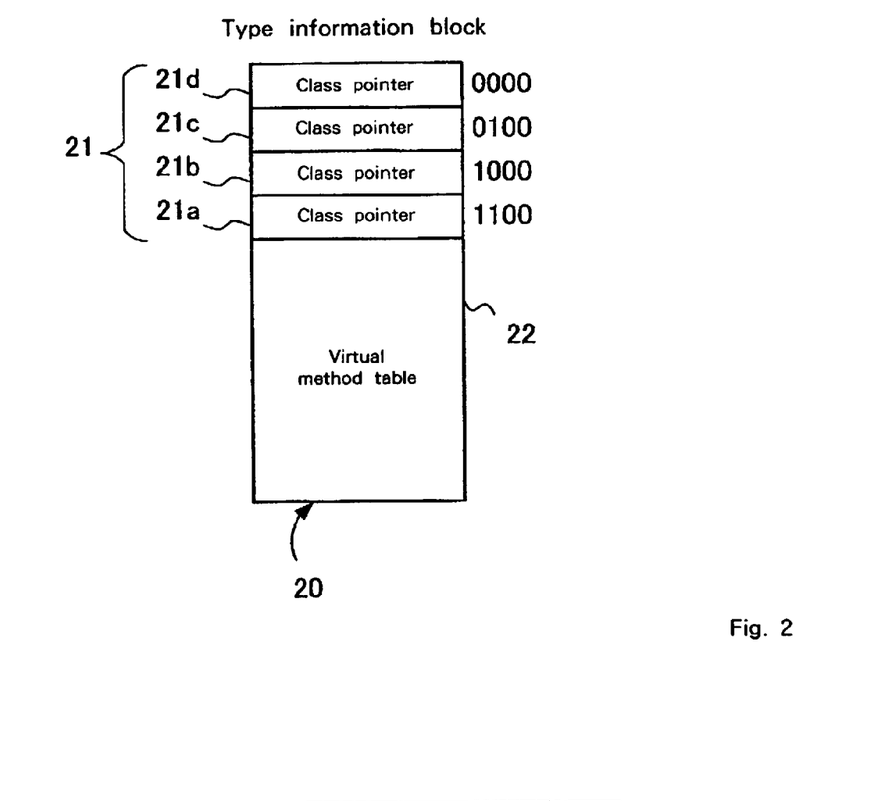
FIG. 2 is a diagram for explaining the configuration of the type information block in an embodiment of the present invention.

The type information block 20 is composed of a class pointer section 21 and a virtual method table 22. FIG. 2 is a diagram for explaining the configuration of the type information.

Referring to FIG. 2, the class pointer section 21 is what a class pointer 121 in the conventional type information block 120 shown in FIG. 5 is extended in multilevel toward a lower address. Thereby a plurality of class pointers is established in the class pointer section 21. These class pointers are associated with the states of the object to be represented, i.e. when representing $2^m$ states of the object, $2^m$ class pointers are correspondingly established in the class pointer section 21. In the example shown in FIG. 2, four (m=2) class pointers 21a–21d are established.

In the embodiment of the present invention, states of the object are represented by utilizing the configuration of the above type information block 20 and further using predetermined bits of the header 11 of the object 10. $2^m$ states of the object are represented by using m bits. Assuming that the size of each class pointer 21a–21d in the class pointer section 21 of the type information block 20 is $2^n$ bytes, m lower bits(ranging from (m+n)-th bit to (n+1)-th bit) of T pointer are used.

Values of these bits are initially set to "1", then a transition of the state is represented by clearing a bit, i.e. setting to "0", while the state is determined by bit test. This determination of state is extremely simple as well as the above-mentioned prior art where the states of the object 110 are represented by only using the bits of the header 111 of the object 110.

Next, how to configure the type information block 20 will be described. As described above, the class pointer section 21 is formed by extending the class pointers 21a–21d in multilevel toward a lower address from class pointer 21a. Now, among T pointers in the header 11 of the object 10 that point to the type information block 20, we call T pointer that points to the class pointer 21a at the highest address as "base T pointer".

Then we allocate the type information block 20 so that (m+n) lower bits of the base T pointer defined in this manner should be $(2^{(m+n)}-1)-(2^n-1)$.

Next, allocating $2^m$ class pointers in multilevel toward a lower address from the address pointed by this base T pointer.

FIG. 1 and FIG. 2 show an example when m=2, n=2, where it is seen that lower bits(2+2 bits) of the base T pointer are 1100, and 4(=$2^2$) class pointers 21a–21d are allocated.

With the scheme for configuring the type information block 20 in this manner, base T pointer will be stored in the header 11 when the header 11 of the object 10 is initialized.

Thereafter, the value of the T pointer to the type information block 20 changes depending on the change of state of the object 10, however, it will slide to any one of multileveled class pointers 21a–21d.

As described above, when accessing the class pointers 21a–21d, values of these class pointers are immediately acquired from T pointer according to the multilevel structure. Therefor, an overhead is zero.

On the other hand, when accessing the virtual method table 22, T pointer needs to be transformed to base T pointer prior to the access. More specifically, logical OR operation, where the value of T pointer at that time is ORed with the value of (m+n) lower bits of base T pointer, i.e. $(2^{(m+n)}-1)-(2^n-1)$ is performed. Therefor, an overhead occurs in similar manner to the prior art shown in FIG. 5 where the states of the object 110 are represented using lower bits of the pointer to the type information block 120.

Figure 3:
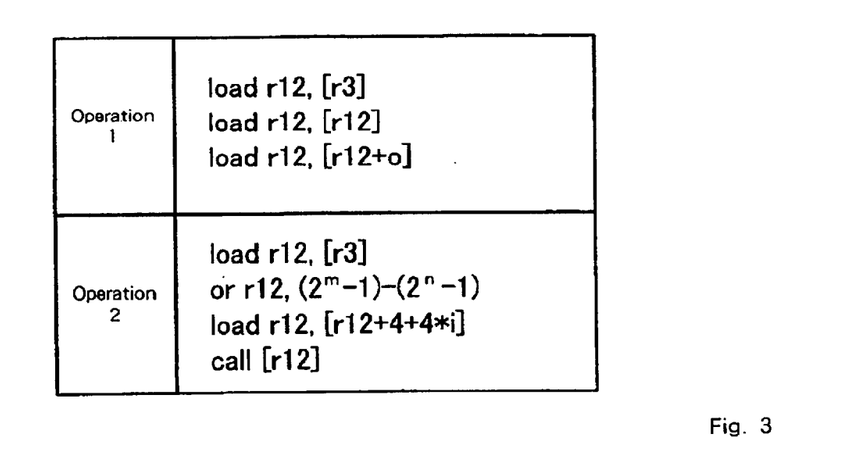
FIG. 3 shows a modified example of operation codes shown in FIG. 6, where the state of the object is represented using (m+n) lower bits of a pointer to the type information block, according to an embodiment of the invention.

FIG. 3 shows a modified example of operation codes shown in FIG. 6, where the state of the object 10 is represented using (m+n) lower bits of T pointer in the header 11 of object 10, according to an embodiment of the invention.

Comparing FIG. 3 and FIG. 6, in operation 1 where referring to a member in the class structure 30 at offset "o", both codes are the same, however, in operation 2 where calling a method at index "i" in the virtual method table 22, a logical operation code or r12, $(2^{(m+n)}-1)-(2^n-1)$ is added after the first line, i.e. load r12, [r3].

In this manner, access performance to the class structure where a lot of important data are included does not degrade. Therefor, in a language or a processing system such as Java where an access to class pointers 21a–21d mainly occurs and the virtual method table 22 is infrequently accessed, execution efficiency does not significantly degrade. However, it can not be denied that execution efficiency might be significantly influenced depending on a language or a processing system.

Figure 4:
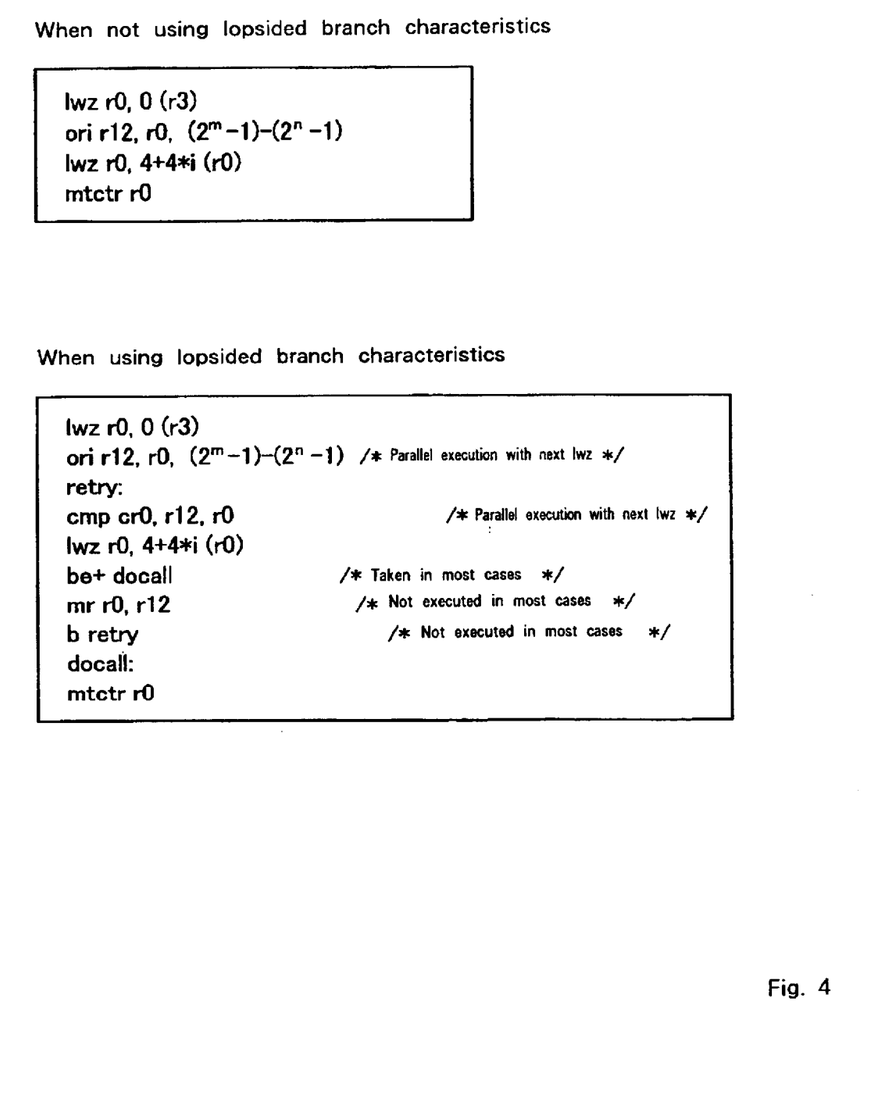
FIG. 4 shows a contrast between code lines where lopsided branch characteristics are not used and code lines where lopsided branch characteristics are used.

But if T pointer in the header 11 of the object 10 hardly changes from base T pointer, i.e. the state of the object 10 hardly changes and point of T pointer hardly changes from class pointer 21a, a processor that has the parallel execution capability on instruction level and a hardware for branch prediction, an influence on execution performance can be reduced by using lopsided branch characteristics.

FIG. 4 shows a contrast between code lines where lopsided branch characteristics are not used(code lines 1 hereinafter) and code lines where lopsided branch characteristics are used(code lines 2 hereinafter). In each code shown in FIG. 4, "lwz" corresponds to "load" in FIG. 3, "ori" corresponds to "or" in FIG. 3, and "mtctr" corresponds to "call" in FIG. 3. "cmp" compares the values of registers, "be+" branches based on the comparison result of "cmp", and "mr" moves a register value.

Referring to FIG. 4, in the code lines 2, the third line and forth line, i.e.
retry:
cmp cr0, r12 r0
and the sixth line to ninth line, i.e.
be+ docall
mr r0, r12
b retry
docall:
are added to the code lines 1.

In code lines 1, total five cycles are required to reach "mtctr", including 2 cycles in "lwz", 1 cycle in "ori", and 2 cycles in "lwz". Since these three instructions have data dependency, they can not be executed in parallel so that five cycles are necessarily needed to execute them.

In contrast, code lines 2 are executed in the following order, i.e. lwz(2 cycles), ori(1 cycle), cmp(1 cycle), lwz(2 cycles), be+(1 cycle) and mtctr. Here ori(1 cycle), cmp(1 cycle) are executed in parallel with the second "lwz". Further "be" is considered to consume near 0 cycle since prediction with the branch prediction hardware almost hits. Therefor these instructions are executed in four cycles after all.

Executing the parallel processing using the lopsided branch characteristics in this manner, it becomes possible to reduce the degradation of execution performance.

As mentioned above, according to the present invention, in order to represent the state of the object, a representation method to be fast and have an extremely little effect on the execution efficiency of a processing system can be implemented.

What is claimed is:

1. A computer system that implements an object-oriented programming language, comprising:
    an object, a type information block, and a class structure as runtime representation for an object in the object-oriented programming language;
    the object having a header including a pointer to the type information block and data itself,
    the type information block having a class pointer pointing to the class structure and a virtual method table,
    a plurality of class pointers are provided depending on the number of states of the object to be represented and individual class pointers are associated with individual states of the object,
    wherein the pointer included in the header of the object uses lower bits of the pointer to point to the class pointers individually in order to represent the Mates of the object, said computer system changing a value of said pointer so that an efficient runtime representation of an object's state using one of said plurality of class pointers in said type information block is available when executing in said computer system.

2. The computer system according to claim 1, wherein the class pointers of the type information block arc provided in multilevel.

3. The computer system according to claim 1, wherein the pointer included in the header of the object uses m middle bits to point to $2^m$ class pointers in order to represent $2^m$ states of the object.

4. The computer system according to claim 1, wherein the number of class pointers is $2^m$ and the size of the class pointers is $2^n$ bytes, and further allocating the type information block so that (m+n) lower bits of the pointer included in the header of the object be $(2^{(m+n)}-1)-(2^n-1)$ when the pointer points to the class pointer at the highest address in the type information block,
    then allocating $2^m$ class pointers in multilevel toward a lower address from the class pointer pointed by said pointer.

5. A virtual machine that executes a program described in an object-oriented programming language on a computer system, comprising:
    an object, a type information block, and a class structure as runtime representation for an object in the object-oriented programming language,
    the object having a header including a pointer to the type information block and data itself,
    the type information block having a class pointer pointing to the class structure and a virtual method table,
    a plurality of class pointers are provided depending on the number of states of the object to be represented and individual class pointers are associated with individual states of the object,
    wherein the pointer included in the header of the object uses lower bits of the pointer to point to the class pointers individually in order to represent the states of the object, said virtual machine changing a value of said pointer so that an efficient runtime representation of an object's state using one of said plurality of class pointers in said type information block is available when executing in said virtual machine.

6. The virtual machine according to claim 5, wherein the class pointers of the type information block arc provided in multilevel.

7. A method for runtime representation of an object described in an object-oriented programming language when executing the object on a computer system that implements the object-oriented programming language, comprises
    an object, a type information block having a plurality of class pointers corresponding to the states of the object, and a class structure pointed by the class pointers;
    wherein the number of class pointers is $2^m$ and the size of the class pointers is $2^n$ bytes, and
    allocating the type information block so that (m+n) lower bits of a pointer included in a header of the object be $(2^{(m+n)}-1)-(2^n-1)$ when the pointer points to the class pointer at the highest address in the type information block, then allocating $2^m$ class pointers in multilevel toward a lower address from the class pointer pointed by said pointer, and
    setting a value of said pointer so that an efficient runtime representation of an object's state using one of said $2^m$ class pointers in said type information block is available when executing in said computer system.

8. The method according to claim 7, wherein initial values of (m+n) lower bits of the pointer included in the header of the object to point to the type information block are set where high order m digits are is and low order digits are 0s,
    wherein the values of (m+n) lower bits of the pointer are changed depending on the change of state of the object in order to point to the class pointer corresponding to that state.

9. A storage media for storing a program that is readable by input means of a computer, comprising a software product implementing a processing system for an object-oriented programming language, wherein an object, a type information block, and a class structure are provided as runtime representation of the object in the object-oriented programming language that is implemented in the computer, the object having a header including a pointer to the type information block and data itself, the type information block having class pointers pointing to the class structure and a virtual method table, the class pointers we provided in multilevel depending on the number of states of the object to be represented and individual class pointers are associated with individual states of the object, wherein the pointer included in the header of the object uses lower bits of the pointer to point to the class pointers individually in order to represent the states of the object, said computer changing a value of said pointer so that an efficient runtime representation of an object's state using one of said class pointers in said type information block is available when executing in said virtual machine.

10. The storage media according to claim 9, wherein the pointer included in the header of the object uses m middle bits to point to $2^m$ class pointers in order to represent $2^m$ states of the object.

11. The storage media according to claim 9, wherein the number of class pointers is $2^m$ and the size of the class pointers is $2^n$ bytes, and further allocating the type information block so that (m+n) lower bits of the pointer included in the header of the object be $(2^{(m+n)}-1)-(2^n-1)$ when the pointer points to the class pointer at the highest address in the type information block, then allocating $2^m$ class pointers in multilevel toward a lower address from the class pointer pointed by said pointer.

12. A program transmission apparatus, comprising:

a storage means for storing a software product implementing a processing system for an object-oriented programming language, wherein an object, a type information block, and a class structure are provided as runtime representation of the object in the object-oriented programming language that is implemented in the computer, the object having a header including a pointer to the type information block and data itself, the type information block having class pointers pointing to the class structure and a virtual method table, the class pointers of the type information block are provided in multilevel depending on the number of states of the object to be represented and individual class pointers are associated with individual states of the object, wherein the pointer included in the header of the object uses lower bib of the pointer to point to the class pointers individually in order to represent the states of the object; and a transmission means for reading a program from the storage means and transmitting the program.

13. The program transmission apparatus according to claim 12, wherein the pointer included in the header of the object uses m middle bits to point to $2^m$ class pointers in order to represent $2^m$ states of the object.

14. The program transmission apparatus according to claim 12, wherein the number of class pointers is $2^m$ and the size of the class pointers is $2^m$ bytes, and further allocating the type information block so that (m+n) lower bits of the pointer included in the header of the object be $(2^{(m+n)}-1)-(2^n-1)$ when the pointer points to the class pointer at the highest address in the type information block, then allocating $2^m$ class pointers in multilevel toward a lower address from the class pointer pointed by said pointer.

* * * * *

UNITED STATES PATENT AND TRADEMARK OFFICE
CERTIFICATE OF CORRECTION

PATENT NO. : 6,886,159 B2
DATED : April 26, 2005
INVENTOR(S) : Tamiya Onodera

It is certified that error appears in the above-identified patent and that said Letters Patent is hereby corrected as shown below:

Column 2,
Line 50, "bytes, The" should read -- bytes. The --.
Line 54, "in the type infornation" should read -- in the type information --.

Column 4,
Line 41, "information blocks, $2^{m}$" should read -- information blocker. $2^{m}$ --.

Column 7,
Line 55, "represent the Mates of" should read -- represent the states of --.
Line 62, "block arc provided" should read -- block are provided --.

Column 8,
Line 34, "block arc provided" should read -- block are provided --.
Line 61, "digits are is" should read -- digits are 1s --.

Column 10,
Line 20, "user lower bib" should read -- uses lower bits --.

Signed and Sealed this

Thirteenth Day of September, 2005

JON W. DUDAS
*Director of the United States Patent and Trademark Office*